United States Patent
Silvestre Duarte et al.

(10) Patent No.: US 12,302,895 B2
(45) Date of Patent: May 20, 2025

(54) DEVICE AND METHOD FOR FREEZING A BIOLOGICAL SOLUTION

(71) Applicant: SMARTFREEZ LDA, Porto Salvo (PT)

(72) Inventors: Andreia Filipa Silvestre Duarte, Scavém (PT); Rui De Brito Estrela, Lisbon (PT)

(73) Assignee: SMARTFREEZ LDA, Porto Salvo (PT)

( * ) Notice: Subject to any disclaimer, the term of this patent is extended or adjusted under 35 U.S.C. 154(b) by 703 days.

(21) Appl. No.: 17/287,767

(22) PCT Filed: Nov. 15, 2019

(86) PCT No.: PCT/IB2019/059836
§ 371 (c)(1),
(2) Date: Apr. 22, 2021

(87) PCT Pub. No.: WO2020/100105
PCT Pub. Date: May 22, 2020

(65) Prior Publication Data
US 2021/0392874 A1   Dec. 23, 2021

(30) Foreign Application Priority Data

Nov. 15, 2018 (PT) .......................................... 115153

(51) Int. Cl.
*A01N 1/02* (2006.01)
*A01N 1/145* (2025.01)
(52) U.S. Cl.
CPC .................... *A01N 1/145* (2025.01)
(58) Field of Classification Search
CPC ...... A01N 1/0257; A01N 1/02; A01N 1/0263; A61B 10/0096; C12M 45/02
(Continued)

(56) References Cited

U.S. PATENT DOCUMENTS

| 7,228,688 B2 | 6/2007 | Voute et al. |
| 2013/0052730 A1 | 2/2013 | Schryver |

(Continued)

FOREIGN PATENT DOCUMENTS

| DE | 102008048709 A1 * | 3/2010 | ........... A01N 1/0284 |
| EP | 3199023 A1 | 8/2017 | |

(Continued)

OTHER PUBLICATIONS

Description DE102008048709A1 Machine English Translation (Year: 2010).*

(Continued)

*Primary Examiner* — Michael L Hobbs
*Assistant Examiner* — Lenora A Abel
(74) *Attorney, Agent, or Firm* — Leason Ellis LLP (57) ABSTRACT

The present disclosure provides systems and methods for use in freezing liquid mixtures or suspensions containing sensitive substances, such as biopharmaceutical materials, under sterile conditions and in small-volume containers. The disclosed device enables the control of ice nucleation of the solution minoring the layer of volume that freezes, while controlling the ice growth rate in a bottom up geometry, and comprises a heat transfer surface (101) with means to control temperature, a holder (102) for multiple containers (109), pressing means (103) to press the holder against the heat transfer surface and optionally a contact promoting material. The disclosed method comprises pre-cooling the device to a temperature substantially below the solution nucleation temperature, placing a container into the holder, contacting the container with the heat transfer surface until a fraction of 10% of the total sample volume is frozen; interrupting the contact between the container and the heat transfer surface; contacting the container with the heat transfer surface at a predefined freezing rate, such that the (Continued)

freezing of the biological solution is homogeneous; until all the volume of the solution is frozen.

9 Claims, 6 Drawing Sheets

(58) Field of Classification Search
USPC ..................................................... 435/307.1
See application file for complete search history.

(56) References Cited

U.S. PATENT DOCUMENTS

| | | | |
|---|---|---|---|
| 2017/0119028 A1 | 5/2017 | Kobayashi et al. | |
| 2017/0333905 A1 | 11/2017 | Fuhr et al. | |

FOREIGN PATENT DOCUMENTS

| | | | |
|---|---|---|---|
| JP | 2017106712 A | 6/2017 | |
| WO | WO 2016/091344 A2 | 6/2016 | |

OTHER PUBLICATIONS

DE102008048709A1 Machine English Translation (Year: 2010).*
Rosa et al., Improving Heat Transfer at the Bottom of Vials for Consistent Freeze Drying with Unidirectional Structured Ice, vol. 17, No. 5, pp. 1049-1059 (Year: 2016).*
DE-102008048709-A1 Machine English Translation (Year: 2008).*
Rodrigues Mabalzan Grosa Mgomes DDE Azevedo Egsingh SK et al.: "The importance of heat flow direction for reproducible and homogeneous freezing of bulk protein solutions", Biotechnol Prog, vol. 29, 2013, pp. 1212-1221.
John Morris Gacton E.: "Controlled ice nucleation in cryopreservation—A review", CRYOBIOLOGY, vol. 66, 2013, pp. 85-92.
Rosa Mónica et al, Improving Heat Transfer at the Bottom of Vials for Consistent Freeze Drying with Unidirectional Structured Ice, [in:] AAPS Pharmscitech, Springer US, New York, vol. 17, No. 5, Oct. 26, 2015, pp. 1049-1059.

* cited by examiner

DEVICE AND METHOD FOR FREEZING A BIOLOGICAL SOLUTION

CROSS-REFERENCE TO RELATED APPLICATIONS

This application is a U.S. National Stage Application under 35 U.S.C. § 371 of International Patent Application No. PCT/IB2019/059836, filed Nov. 15, 2019, which claims priority to Portugal Patent Application No. 115153, filed Nov. 15, 2018, the contents of which are each hereby incorporated by reference in their respective entireties.

TECHNICAL FIELD

This disclosure relates, in general to a device and a method for freezing liquid mixtures or suspensions containing sensitive substances, such as biological materials in multiple small-volume containers, in particular wherein the biological materials are living cells, blood cells, viruses, proteins, antibodies, among others. Furthermore, this disclosure improves the reproducibility of nucleation and crystal growth during freezing of small volumes of aqueous mixtures in multiple containers.

BACKGROUND

Cryopreservation of sensitive substances is essential for many applications, with relevance for the exploitation of cellular biology. Cells or derivatives resulting from its culture are generally cryopreserved for management of production and distribution, including banking for preservation of their genetic material.

One of the major limitations of existing systems is the inconsistency that results from the complexity associated to the freezing and thawing phenomena. This is particularly important for cell therapies, due to therapeutic and safety constraints, which can be seriously compromised by inefficient cryopreservation.

Cryopreservation involves different processes, such as addition of cryoprotective substances, cooling (freezing), heating (thawing), mixing, which are determining of the physical-chemical stability of the biological products. Since cryopreservation involves a sequence of processes, inconsistency is likely to propagate and amplify from the earliest (such as cooling and freezing) to the latest (such as thawing and mixing). Therefore, maximizing freezing consistency is crucial to maximize the overall preservation of the biological products.

Many variables contribute to freezing inconsistency, such as natural convection, nucleation temperature, ice crystals growth rate, supercooling, etc. Two major issues have been related to freezing consistency that are difficult to control namely, natural convection and ice nucleation.

Natural convection is a major cause for the heterogeneity in solutes distribution (cryoconcentration or freeze-concentration) that occurs in frozen solutions of biologics. It has been shown that density-gradient-driven convection is critical, because it displaces the solutes towards the bottom and center of cylindrical containers. The formation of ice dendrites, by using a nonconvective freezing geometry, i.e., by freezing unidirectionally from bottom to top, has been reported to attenuate natural convection thus preventing cryoconcentration [1,2].

Another critical aspect for cryopreservation is the control of ice nucleation temperature and site. In the freezing process, aqueous solutions tend to cool to a temperature below their melting point before ice nucleation occurs, a condition known as supercooling. This has been described to have a compromising effect on cell viability after thawing and therefore in the whole process of cryopreservation. In order to reduce supercooling, several techniques to control ice nucleation have been proposed. Like the introduction of a small ice crystal or heterogeneous nucleators of ice into the sample; by manually generating a cold spot on the outside of the cryocontainer; by electrofreezing; by mechanical methods (shaking, application of ultrasound); by shock cooling or by pressure shift [3].

Despite many methods have been developed, most are difficult to standardize and to integrate to multiple small-volume containers with high levels of reproducibility under sterile conditions, ensuring cell viability and reproducibility throughout the cryopreservation process. Moreover, most methods that have been described to improve the consistency of freezing have been applied to volumes larger than 10 ml. Larger volumes enable easier control of the heat flux due to the larger heat transfer area and thermal inertia of the solution. Conversely, for smaller volumes, as for example 100 µl, the necessary control to enable local nucleation at the vial's bottom while not compromising unidirectional bottom-up freezing faces several technical challenges.

One of the problems associated with freezing systems is the difficult control with respect to the reproducibility of the nucleation temperature and location of the first ice crystals in a batch of multiple vials. This variability may lead to non-uniform properties from vial to vial, which ultimately will lead to variations in cells preservation quality. The approach followed in this disclosure relates to enhancing nucleation by fast cooling of the container's base. To enable fast cooling at the base, the container's heat resistance through the bottom must be minimized. This can be achieved by using a conductive material, such as a liquid with lower freezing point than water, polymer, paste or sticker, that improves the contact between the heat transfer plate and the bottom of the container, i.e. that minimizes the air within both surfaces. Rosa et al. [2] followed this strategy for freeze-dry applications, in which an adhesive material was attached to the bottom of the containers to reduce the air gap formed by the typical glass vials concavity, thus improving the heat transfer coefficient by nearly 2-fold. Despite being effective, the strategy followed by Rosa et al. [2] requires significant modifications to the vials design, which imply many complications for construction and validation from regulatory authorities. For example, the adhesive materials can be a source of contaminants in clean rooms and may also react with the typical materials used in the fabrication of containers for cryopreservation of cells. Another important technical difficulty results in enabling control over nucleation and ice growth rate. In a small volume, the fast cooling of the base, required to enhance nucleation at the bottom, can cause the complete uncontrolled freezing of the sample instead of nucleation only. When the mass of the solution is small, for example smaller than the mass of the container, thermal inertia may govern the dynamic of the freezing process.

Ideally, to decouple nucleation from controlled-rate freezing, the fraction of liquid that freezes during nucleation should not be higher than 20% assuring, preferably lower than 10%, that most of sample freezes at a controlled rate under the bottom-up direction. Therefore, cooling at the bottom should be intense and brief, to enable nucleation of the solution while minoring the layer of volume that freezes uncontrolled, under supercooled conditions. This can be achieved by implementing a sharp cooling of the container's base to a considerably low temperature (typically lower than −40° C.), for example by placing the containers on top of a cold surface. However, to enable consistent nucleation in a batch of multiple containers two criteria are critical a) that all containers are placed on a previously cooled heat transfer surface at the same time and b) that the contact between the bottom of the containers and the heat transfer surface is equivalent, regardless of roughness variations. Roughness variations are likely to cause larger inconsistency as the bottom area of the containers becomes smaller. In order to decouple nucleation from ice growth rate, in unidirectional geometry, it is desirable that the aspect ratio height/width is not smaller than 1, to minimize the height of liquid that supercools by thermal diffusion before the nucleation event, thus minoring the volume of sample than freezes uncontrolled. Therefore, it may be convenient that containers for unidirectional freezing may have a small area at the bottom, which may complicate heat transfer consistency due to typical roughness variations, for example in volumes smaller than a 2 ml. Moreover, it is desirable that only a small fraction of the sample supercools (a maximum of 20%), while the remaining liquid is above freezing temperature (near 0° C.), to avoid extensive ice growth upon nucleation. Which otherwise leads to the uncontrolled freezing of a significant part of the sample (larger than 20%).

The creation of a nucleus implies the formation of an interface at the boundaries of a new phase. Liquids cooled below the maximum heterogeneous nucleation temperature (melting temperature), but which are above the homogeneous nucleation temperature (pure substance freezing temperature) are called supercooled.

The present disclosure aims at solving the above-mentioned problems.

BRIEF DESCRIPTION OF THE DRAWINGS

These and other objects, features and advantages of the disclosure will be evident from the following detailed description when read in conjunction with the accompanying drawings.

For an easier understanding of the disclosure the attached drawings are joined, which represent preferred embodiments of the disclosure that, however, are not meant to limit the object of the present application.

GENERAL DESCRIPTION

In the present disclosure unidirectional geometry means the creation of a unidirectional temperature gradient along an axis that causes the ice-front to develop and progress along the chosen axis. In particular, unidirectional bottom-up geometry means the creation of a unidirectional temperature gradient along the vertical axis that causes the ice-front to develop and progress from bottom to top.

In the present disclosure, controlled nucleation refers to formation of the first ice crystals within a short time interval, preferentially less than a minute, after the containers contact with the heat transfer surface. It happens specifically in the bottom surface of the containers and the fraction of liquid that freezes immediately upon nucleation (due to local supercooling) should not be higher than 20%.

In an embodiment, the freezing is unidirectional from the bottom of the container to the top. Due to the isolation of the holder with a low heat conductivity material, the freezing is achieved in a controlled manner and one of the advantages of the present disclosure when compared to other similar technologies is that the freezing is not radial. For this reason, the freezing of the content of the vial is controlled, homogeneous, and more effective, irrespective of the total volume of the sample.

One of the surprising effects provided by the method of the present invention is that the freezing is homogeneous between vials of the same freezing cycle. This means that the content of each vial is uniformly frozen and frozen in the same way as the other vials of the same freezing cycle. Additionally, the freezing efficacy is high weather the vial contains 1 µl of solution or 100 ml of solution.

In a further embodiment the present disclosure relates to a device for freezing a biological solution comprising:
a heat transfer surface (101);
a holder (102) comprising at least a cavity for a container (109) for the biological solution;
pressing means (103) for pressing the holder (102) against the heat transfer surface (101), wherein the pressing means are configured for: placing the container (109) in contact with the heat transfer surface (101), transferring heat from the heat transfer surface (101) to the container (109) and enabling controlled nucleation, removing the container (109) away from the heat transfer surface (101) and replacing the container (109) in contact with the heat transfer surface (101);
such that the freezing of the biological solutions has a bottom-up geometry.

In an embodiment, the pressing means (103) may comprise a compressor (108) for countering the holder (102), such that an even-distributed pressure is applied on the holder (102), preferably wherein a manual or a mechanical even-distributed pressure is applied on the holder (102).

In an embodiment, the holder (102) may be made of a low heat conductivity material, preferably and to obtain even better results the low heat conductivity material is plastics, ceramics or a composite.

In an embodiment, the device now disclosed comprises at least a container (109).

In an embodiment, the pressing means are configured for: placing a portion of the container (123) in contact with the heat transfer surface (101), transferring heat from the heat transfer surface (101) to the portion of the container (123), removing the container (109) away from the heat transfer surface (101) and replacing the portion of the container (123) in contact with the heat transfer surface (101), preferably wherein the portion of the container is the bottom of the container.

In an embodiment, the holder (102) may comprise compressible means (102a, 102b, 102c) selected from a spring (118), a tab (120) or a pin (212), such that the holder (102) is compressible between a first position and a second position, wherein the first position places the bottom of the container (123) in contact with the heat transfer surface (101) and the second position places the bottom of the container (123) away from the heat transfer surface (101).

In an embodiment, the holder (102) may be a compressible holder compressible between a first position and a second position, wherein the first position places the bottom of the container (123) in contact with the heat transfer surface (101) and the second position places the bottom of the container (123) away from the heat transfer surface (101).

Figure 5:
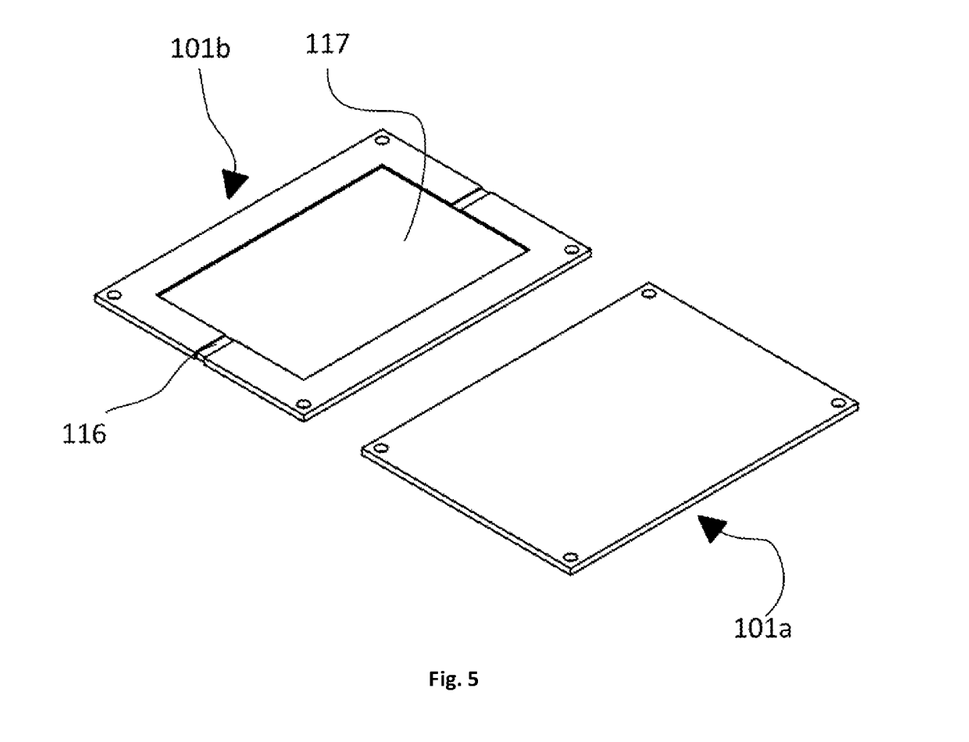
FIG. 5 schematically illustrates two examples of the heat transfer surface, wherein the reference numerals indicate: 101a—flat configuration; 101b—recess configuration; 116—channels; 117—recess of the heat transfer surface.

In an embodiment, the holder (102) may be pressed against a flat configuration (101a) of the heat transfer surface (101).

In an embodiment, the holder (102) may be pressed against a recess configuration (101b) of the heat transfer surface (101), preferably wherein the recess (117) of the heat transfer surface (101b) is a depression with a depth comprised between 0.5-3 mm.

In an embodiment, the heat transfer surface (101) may be a channel (116) for removing an excess of liquid, preferably for removing an excess of a contact promoting material.

In an embodiment, the channel (116) may have a depth of 0.5-3 mm, and a width from 1-5 mm.

Figure 1:
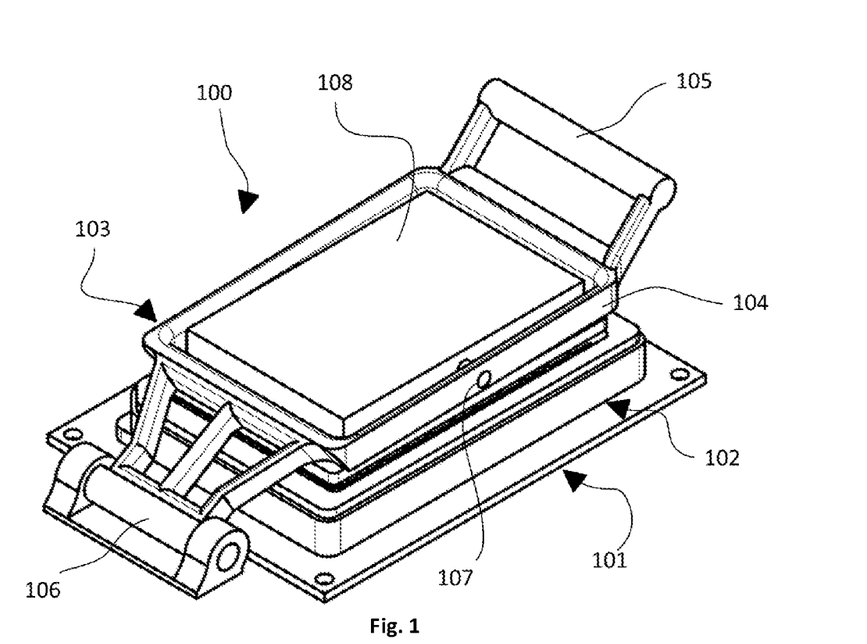
FIG. 1 schematically illustrates a general perspective of an example of the freezing device, when the press is locked down, wherein the reference numerals indicate: 100—freezing head; 101—heat transfer surface; 102—holder; 103—pressing means; 104—pressing means frame; 105—handler; 106—hinge; 107—pivot; 108—compressor.
Figure 2:
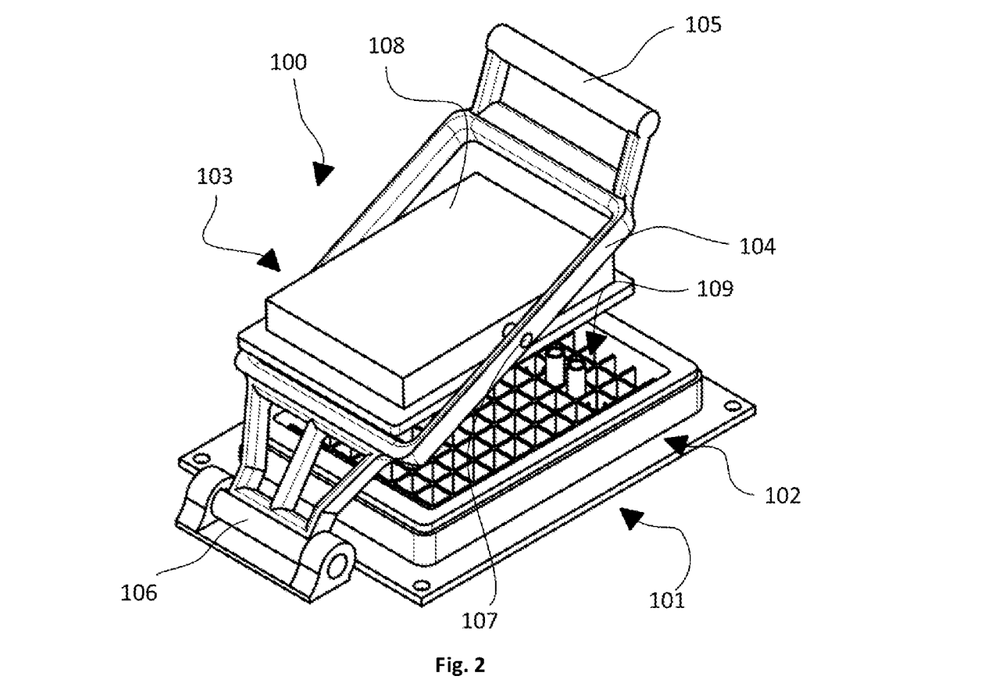
FIG. 2 schematically illustrates a general perspective of an example of the freezing device, when the press is unlocked, wherein the reference numerals indicate: 100—freezing head; 101—heat transfer surface; 102—holder; 103—pressing means; 104—pressing means frame; 105—handler; 106—hinge; 107—pivot; 108—compressor; 109—container.

In an embodiment, the device now disclosed may further comprise a pressing means frame (104), wherein the pressing means frame (104) comprises a hinge (106) and a handler (105).

In an embodiment, the heat transfer surface (101) may be made of a conductive material selected from stainless steel, copper, aluminium, or mixtures thereof.

Figure 3:
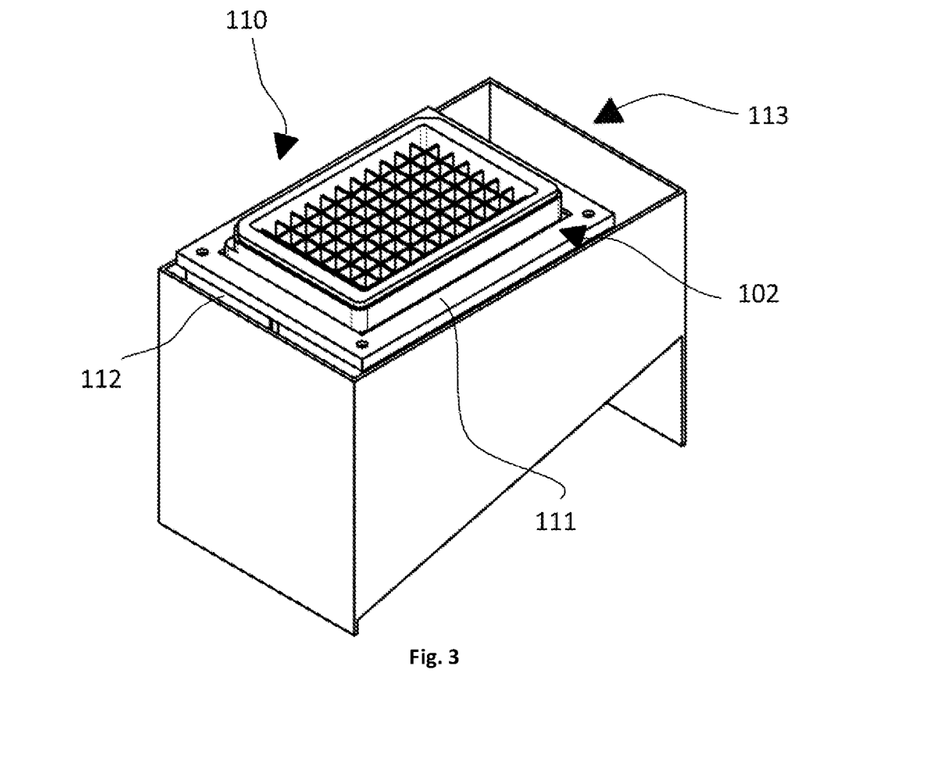
FIG. 3 schematically illustrates a general perspective of an example of the freezing device within the cooling system, wherein the reference numerals indicate: 102—holder; 110—system; 111—insulation frame; 112—fin supporter; 113—coolant reservoir.

In an embodiment, the device may further comprise a coolant reservoir (113) for storing the cooling agent.

In an embodiment, the device may further comprise an insulation frame (111) for insulating the heat transfer surface from the room temperature and for protecting the user.

Figure 4:
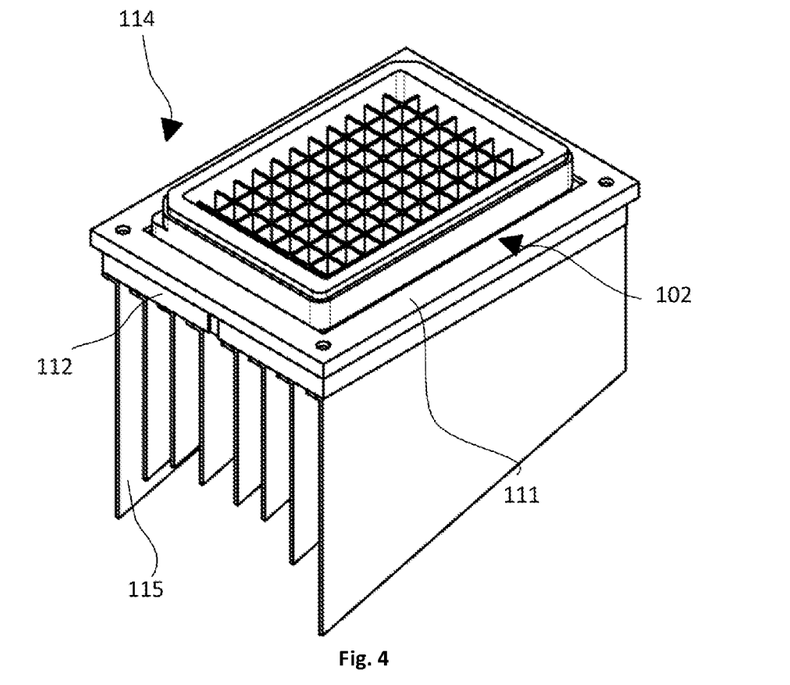
FIG. 4 schematically illustrates a general perspective of an example of the freezing device, wherein the reference numerals indicate: 102—holder; 111—insulation frame; 112—fin supporter; 114—system; 115—fins.

In an embodiment, the device may further comprise a fin supporter (112) for attaining a uniform heat exchange.

In an embodiment, the device may further comprise fins (115) for providing a larger contact area with a cooling agent.

Figure 6:
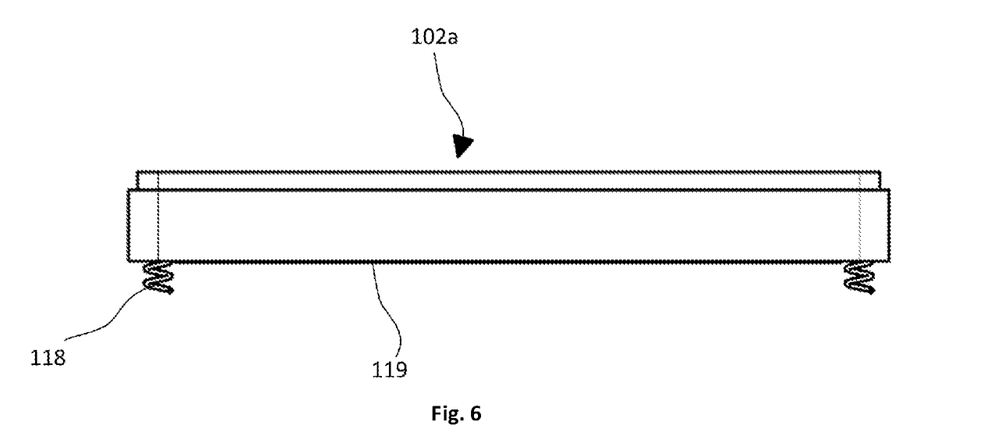
FIG. 6 schematically illustrates an example of the holder configuration, wherein the reference numerals indicate: 102a—compressible means with spring configuration; 118—spring; 119—contact layer.
Figure 7:
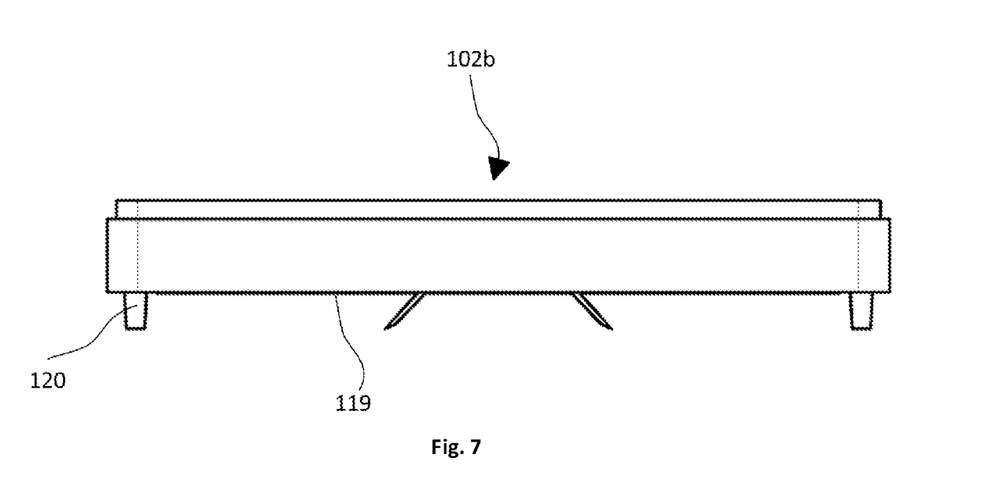
FIG. 7 schematically illustrates an example of the holder configuration, wherein the reference numerals indicate: 102b—compressible means with tab configuration; 119—contact layer; 120—tab.
Figure 8:
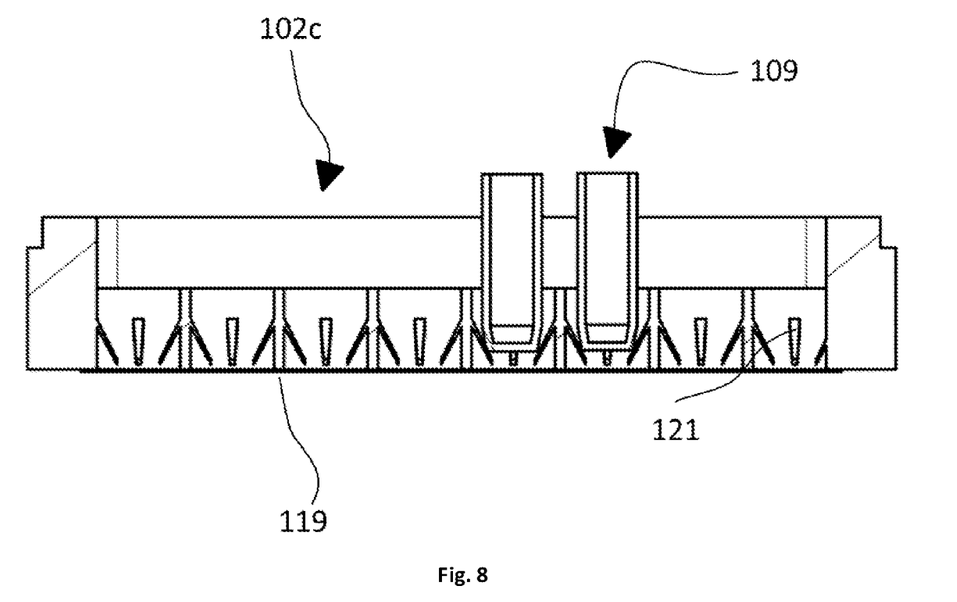
FIG. 8 schematically illustrates an example of the holder configuration, wherein the reference numerals indicate: 102c—compressible means with pins configuration; 109—container; 119—contact layer; 121—pins.

In an embodiment, the device may further comprise a contact layer (119) for removing the residual air between the heat transfer surface (101) and the container (109), preferably wherein the contact layer (119) is a liquid, a paste, a paper or a sticker, preferably wherein the contact layer (119) has a height from 0.1 mm-3 mm.

Figure 9:
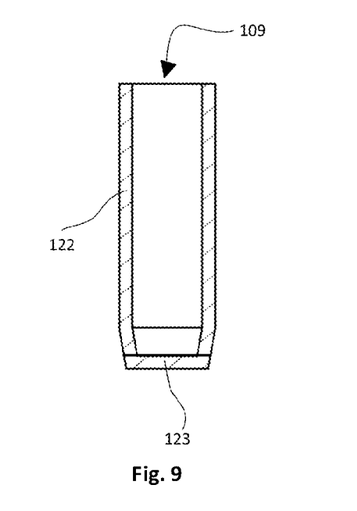
FIG. 9 schematically illustrates an example of a container configuration, wherein the reference numerals indicate: 109—container; 122—container wall; 123—container bottom.

In an embodiment, the container (109) may have an height from 5-50 mm and a diameter from 4-10 mm.

In an embodiment, the container may have an aspect ratio height/width higher than 1.

In an embodiment, container wall (122) may have a thickness from 0.4-2 mm, and the container bottom (123) has a thickness from 0.2-2 mm.

In an embodiment, the container wall (122) and the bottom of the container (123) are made of different materials.

In an embodiment, the container wall (122) is made of polymers, ceramics, glass or other low heat conductive materials.

In an embodiment, the bottom of the container (123) is made of high conductivity materials such as stainless steel, aluminium or others, or build using low conductive materials such as polymers, glass or others.

In an embodiment, the device is a freezing device.

The present disclosure also relates to a method for operating the device now disclosed, comprising the following steps:
pre-cooling the device;
placing a container (109) containing the biological solution into a holder (102);
contacting the bottom of the container (123) with a heat transfer surface (101) using pressing means (103),
removing the container (109) from contacting the heat transfer surface (101);
re-placing the bottom of the container (123) with the heat transfer surface (101) using the pressing means (103);
setting a controlled freezing rate such that the freezing of the biological solution has a bottom-up geometry.

In an embodiment, said controlled freezing rate of the biological solution within said container may be from 0.1° C./min-100.0° C./min, preferably 0.5° C./min-10° C./min, more preferably 1° C./min-5° C./min.

In an embodiment, the step of pre-cooling the device may be carried out at a temperature lower than −20° C., preferably lower than −30° C., more preferably lower than −40° C.

In an embodiment, the step of removing the container (109) from the heat transfer surface (101) may be carried out by placing the container (109) away from the heat transfer surface (101), preferably by an air gap from 0.1 mm up to 15 mm, while maintaining a biological solution at a temperature near 0° C.

In an embodiment, the step of re-contacting the container (109) with the heat transfer surface (101) may be carried out by placing the container (109) in contact with the heat transfer surface (101) by pressing the holder (102) against the heat transfer surface (101).

In an embodiment, the biological solution may comprise a: microorganism, tissue, live cell, stem cell, primary cell, cell line, live or attenuated virus, nucleic acid, monoclonal antibody, polyclonal antibody, biomolecule, non-peptide analogue, peptide, protein, RNA, DNA, oligonucleotide, viral particle, or mixtures thereof.

This disclosure also relates to a biological solution frozen according to the method now disclosed.

In an embodiment, the disclosure relates to a method for bottom up geometry freezing and/or nucleation of a sample solution, comprising the following steps:
  pre-cooling a device to a temperature substantially below the solution nucleation temperature, wherein the device comprises at the bottom a heat transfer surface and pressing means;
  placing a container containing the biological solution into a holder, wherein the holder comprises a low heat conductivity material;
  contacting the container with the heat transfer surface until a fraction of 10% of the total sample volume is frozen;
  interrupting the contact between the container and the heat transfer surface;
  contacting the container with the heat transfer surface at a predefined freezing rate, such that the freezing of the biological solution is homogeneous;
  until all the volume of the solution is frozen.

In another embodiment, the disclosure relates to a comprising a plurality of samples.

In a further embodiment, the disclosure relates to a method, wherein the controlled freezing rate of the biological solution within said container is from 0.1° C./min-100.0° C./min, preferably 0.5° C./min-10° C./min, more preferably 1° C./min-5° C./min.

In a further embodiment, the disclosure relates to a method, wherein the step of pre-cooling the device is carried out at a temperature lower than −20° C., preferably lower than −30° C., more preferably lower than −40° C.

In a further embodiment, the disclosure relates to a method, wherein the step of interrupting the contact between the container and the heat transfer surface is carried out by placing the container away from the heat transfer surface, preferably by an air gap from 0.1 mm up to 15 mm, while maintaining a biological solution at a temperature near 0° C.

In a further embodiment, the disclosure relates to a method, wherein the step of contacting the container with the heat transfer surface at a predefined freezing rate is carried out by placing the container in contact with the heat transfer surface by pressing the holder against the heat transfer surface.

In a further embodiment, the disclosure relates to a method, wherein the biological solution comprises a: microorganism, tissue, living cell, stem cell, primary cell, cell line, live or attenuated virus, nucleic acid, monoclonal antibody, polyclonal antibody, biomolecule, non-peptide analogue, peptide, protein, RNA molecule, DNA molecule, oligonucleotide, viral particle, or mixtures thereof.

In a further embodiment, the disclosure relates to a device for bottom up geometry freezing, and/or nucleation of a sample solution, comprising:
  a heat transfer surface at the bottom;
  a holder comprising at least one cavity for a container, wherein the holder comprises a low heat conductivity material;
  pressing means configured for placing the container in contact with the heat transfer surface, transferring heat from the heat transfer surface to the container; removing the container away from the heat transfer surface and re-contacting the container with the heat transfer surface;
  wherein the heat transfer is carried out from the bottom of the container, enabling controlled nucleation.

In a further embodiment, the disclosure relates to a device, wherein the pressing means comprise a compressor for countering the holder, such that an even-distributed pressure is applied on the holder, preferably wherein a manual or a mechanical even-distributed pressure is applied on the holder.

In a further embodiment, the disclosure relates to a device, wherein the low heat conductivity material is plastic, ceramic or a composite.

In a further embodiment, the disclosure relates to a device comprising at least a container.

In a further embodiment, the disclosure relates to a device, wherein the pressing means are configured for: placing a portion of the container in contact with the heat transfer surface, transferring heat from the heat transfer surface to the portion of the container, removing the container away from the heat transfer surface and replacing the portion of the container in contact with the heat transfer surface, preferably wherein the portion of the container is the bottom of the container.

In a further embodiment, the disclosure relates to a device, wherein the holder comprises compressible means selected from a spring, a tab or a pin, such that the holder is compressible between a first position and a second position, wherein the first position places the bottom of the container in contact with the heat transfer surface and the second position places the bottom of the container away from the heat transfer surface.

D In a further embodiment, the disclosure relates to a device, wherein the holder is a compressible holder between a first position and a second position, wherein the first position places the bottom of the container in contact with the heat transfer surface and the second position places the bottom of the container away from the heat transfer surface.

In a further embodiment, the disclosure relates to a device, wherein the holder is pressed against a flat configuration of the heat transfer surface.

In a further embodiment, the disclosure relates to a device, wherein the holder is pressed against a carved configuration of the heat transfer surface, preferably wherein the carved plateau configuration of the heat transfer surface is a depression with a depth between 0.5-3 mm.

In a further embodiment, the disclosure relates to a device, wherein the heat transfer surface has a channel for removing an excess of liquid, preferably for removing an excess of a contact promoting material.

In a further embodiment, the disclosure relates to a device, comprising a pressing means frame comprising a hinge and a handler.

In a further embodiment, the disclosure relates to a device, wherein the heat transfer surface is made of a conductive material selected from stainless steel, copper, aluminium, or mixtures thereof.

In a further embodiment, the disclosure relates to a device, comprising a coolant reservoir for storing the cooling agent.

In a further embodiment, the disclosure relates to a device, comprising an insulation frame for insulating the heat transfer surface from the room temperature and for protecting the user.

In a further embodiment, the disclosure relates to a device, comprising a fin supporter for attaining a uniform heat exchange over the exposed area.

In a further embodiment, the disclosure relates to a device, comprising fins for providing an increase of a contact area with the cooling agent.

In a further embodiment, the disclosure relates to a device, comprising a contact layer for removing the residual air between the heat transfer surface and the container.

In a further embodiment, the disclosure relates to a device, wherein the contact layer is a liquid, a paste, a paper or a sticker, preferably wherein the contact layer has a height from 0.1 mm-3 mm.

In a further embodiment, the disclosure relates to a device, wherein the container has an aspect ratio height/width higher than 1.

In a further embodiment, the disclosure relates to a device, wherein the container wall and the container bottom are made of different materials.

In a further embodiment, the disclosure relates to a device, wherein the container wall is made of polymers, ceramics, glass or other low heat conductive materials.

In a further embodiment, the disclosure relates to a device, wherein the bottom of the container is made of a high conductivity material selected from stainless steel, aluminium or others, or build using low conductive materials such as polymers, glass or others.

In a further embodiment, the disclosure relates to a device, wherein the device is a freezing device.

In a further embodiment, the disclosure relates to a biological solution frozen according to the disclosure.

DETAILED DESCRIPTION

As described above, one of the major limitations of cryopreservation of sensitive substances, such as biological materials and solutions, is the inconsistency associated to the freezing and thawing phenomena. Many variables contribute to freezing inconsistency, with the two major issues related to natural convection and ice nucleation.

Herein, it is disclosed a new device and method that enable unidirectional bottom-up freezing in a batch of containers, with high reproducibility for small volumes, preferably lower than 2 ml.

It is also described a method to enable unidirectional bottom-up freezing in a batch of small-volume containers including the following steps: pre-cooling the heat transfer surface to a low temperature (for example lower than −40° C.); setting multiple containers in a holder and contacting all the containers simultaneously with the cold surface by pressing the holder towards the heat transfer surface, using an intermediate contact promoting material (such as a liquid or a polymer), to enable control nucleation; after nucleation of a minor layer of volume, setting the holder and the containers to a position separated from the cold surface; finally pressing the holder against the cold surface while controlling the ice growth rate in unidirectional bottom-up geometry.

Therefore, the device of freezing a biological solution, wherein the biological solution is a liquid biological solution or a suspension, herein described to attain the previously described method, comprises a driver that forces the containers with down force to meet the heat transfer surface on a lock down position. The nucleation process starts when the containers are pressed against the heat transfer surface, all at the same time, using an intermediate contact promoting material to assure that the fraction of liquid that freezes during nucleation is not be higher than 20% of the total volume. Then, to avoid that the liquid freezes uncontrolled after the nucleation event, the driver is set to the lock up position, and the containers stand in a standby position separated from the heat transfer surface by a air gap that go from 0.1 mm up to 15 mm, while maintaining the biological solution near 0° C. Finally, to promote a unidirectional bottom-up freezing under a controlled ice growth rate, the driver is pressed down again to promote the contact of the bottom of the containers with the heat transfer surface and is applied the chosen freezing rate, by cooling the heat transfer surface typically from 0.1° C./min to 100° C./min depending of the thermal sensitivity of the biological material.

The device of freezing biological solutions herein described to attain the previously described method, comprises the following elements: a freezing head (100) which includes a heat transfer surface (101), may include a holder (102) with receiving cavities in which containers (109) are fit, and may also include pressing means (103). The freezing altar is connected to a system (114) apparatus which can be represented in different configurations and use several cooling agents and or other known cooling systems. The apparatus of the freezing head plus the cold system can be presented in a configuration of involvement by a container and or insulations such as the example on FIG. 3.

In an embodiment, which is represented from FIGS. 1 to 9, which are not intended to limit the object of the present application, is shown a device for preserving, by process of freezing and/or thawing, storage and transportation of biological materials.

In an embodiment, the containers (109) will hold the biological samples during the freezing, thawing, store and transportation of these. They are specially build using biological safe materials to maintain the samples safe during all the process. The containers (109) are designed accordingly to fit the holder (102) cavities, different volume samples and different thermal processes desired. The container (109) specifications, are taken in account to a specific whole process of thermal exchange. The containers (109) can have an height from 5 mm to 50 mm and a diameter from 4 mm to 10 mm, with an aspect ratio (height/width) higher than 1. The container wall (122) might have a thickness from 0.4 mm to 2 mm, and the container bottom (123) can differ the thickness from 0.2 mm to 2 mm.

In an embodiment, to maintain the unidirectional freezing process herein proposed, the container wall (122) and the container bottom (123) may be of different materials. The container wall (122) can be built of polymers, ceramics, glass or other low heat conductive materials in order to keep the low conductivity on the lateral surface from the container (109). The container bottom (123) can be built using high conductivity materials such as stainless steel, aluminium or others, or build using low conductive materials such as polymers, glass or others. The bottom of the container (109), depending on the thermal dynamic figured for a specific heat exchange method employed, may have low or high transfer coefficient. The difference from the materials can be handy to obtain vertical driven heat flux gradients without significant influence from the container wall (122), specially, when freezing with small volume samples, since the mass ratio from the container (109) compared to the sample volume is significant.

In an embodiment, the cold system (114) is represented by the freezing head (100) and other elements that will allow controlling the temperature on the heat transfer surface (101), and containers (109). The integrative parts can be any electronics, mechanical or machined used to create a controlled driven heat flux through the cold system (114). In FIG. 4 is represented an example of a cold system setup. Fins (115) will transfer the heat between the cooling agent that can be dry ice, liquid nitrogen or other. The cooling agents are stored on the coolant reservoir (113). The fin supporter (112) is directly attached to the fins (115) and will help to avoid temperature fluctuations when the containers (109) and holder (102) are put in contact with the heat transfer surface (101). When the containers (109) contact the heat transfer surface (101) the inertia from the heat transfer surface (101) will freeze a small layer of the sample, less than 20% of the total volume, inside the containers (109) while also the heat transfer surface (101) rises the temperature during the heat exchange. Since the temperature from the heat transfer surface (101) rose to a higher temperature during the formation of the first ice layer on the containers (109), the ice growth will become now slower and controlled by the fin supporter (112) temperature.

In an embodiment, the freezing head (100) which always include a horizontal plate so-called heat transfer surface (101) is built in a specifically configuration to receive containers (109) containing biological solutions or a holder (102) where the containers (109) are introduced. The freezing head (100) and respective included parts and embodiments are designed with specific characteristics to control the heat transfer flux from the cold system (114), passing through the heat transfer surface (101), finalizing on the bottom of the containers (123). One of the possible configurations, shown in FIG. 1 and FIG. 2, that increase the heat transfer from the heat transfer surface (101) up to the containers (109) is due to the existence of pressing means (103) which will force the containers (109) to be tight to the heat transfer surface (101), shutting virtually all the air gap between these.

In an embodiment, the heat transfer surface (101) is made of conductive materials such has stainless steel, copper, aluminium or other, and the dimensions can vary so it can receive one container (109), several or a holder (102) that can also have different sizes. The size of the heat transfer surface (101) will be such as that the upper surface can have from 1 cm$^2$ to 150 cm$^2$ depending of the type and number of received items. The thickness of the heat transfer surface (101) can be from 1 mm up to 4 mm. The heat transfer surface (101) is represented in the embodiments in a rectangular shape, but it may take any other shape depending on the design of the device. However, the heat transfer surface (101) dimensions in a specific configuration are such to have in account the characteristics from the entire device, allowing to have a well-known global thermal conductivity and inertia. The heat transfer surface (101) might be attached to the cold system (114) by means of screws, any type of glue or paste. Can also be just guided or compressed by other means of lock.

In an embodiment, to remove the residual air between the heat transfer surface (101) and the containers (109) or holder (102) a fluid, paste, paper, sticker or other mean of removing the air gap between both can be used. This feature will increase the heat transfer and make it homogeneous. In the case of the sticker or paste it can also be added to the container (109) or the holder (102) as a contact layer (119). The height from this contact layer can go as 0.1 mm to 3 mm. Also, in the case of a non-solid contact layer, the height can be fixed and the container (109) or holder (102) may move closer or far away from the heat transfer surface (101) while still immersed, allowing this way to change the range from heat flux during the process.

Herein two examples, which are not limitative, of the design of the heat transfer surface (101) configuration are presented; a flat configuration (101a) or a recess configuration (101b). The recess version (101b) here described may comprise channels (116) and a recess of the heat transfer surface (117), which have the objective of maintaining a specific fluid height between the heat transfer surface (101) and the container (109). The recess of the heat transfer surface (117) has the finality of retaining a specific height layer of the fluid used. If the user overfill recess of the heat transfer surface (117), the excedent fluid will escape by the channels (116) maintaining the desired fluid height. The depression of the recess of the heat transfer surface (117) can have a depression depth comprised between 0.5 mm and 3 mm. The channels (116) will offload the excess of fluid from the recess of the heat transfer surface (117) and guide the fluid to a sinkhole on the outer side of the heat transfer surface (101), the excedent fluid can then travel through other sinkhole guides on the device. The channels (116) can have a depth of 0.5 mm up to 3 mm, and a width from 1 mm up to 5 mm.

In an embodiment, the holder (102) is designed to receive the containers (109) and can have different cavity designs and sizes depending on the type of containers (109) received. Also the configuration might differ for the number of received containers (109) and the configuration of heat transfer surface (101) where it will be used. The materials used to build the holder (102) can be plastics, ceramics, composite or other materials that have low heat conductivity in order to insulate the lateral and top of the containers (109). The holder (102) can also have embodiments from any other materials with several functionalities.

Three examples from holders (102) are presented in FIG. 6, FIG. 7 and FIG. 8. These examples figure the possibility of control the precise time when the containers (109) will be pressed against the heat transfer surface (101). These are designed to be used with pressing means (103) actuation system to compress the containers (109) against the heat transfer surface (101). In these examples which are not limitative, the air is removed using an embodiment of contact layer (119), this in other cases can be replaced by a contact promoting material, such a liquid or other, applied on the holder (102) or on the heat transfer surface (101). The contact layer (119) when is directly added to the holder (102) can be made of any sticker or glued in a layer of teflon, polymer, or others. The thickness of this layer can go from 0.1 mm up to 2 mm. However the additional heat resistance added by this have to be taken in account for the general heat flow device.

In an embodiment, the holder with spring configuration (102a) will maintain the containers (109) on a ready to start lock up (FIG. 2) position, by the mechanical resistance from the springs (118). When the pressing means (103) forces the containers (109) with down force enough to override the spring elastic force, these, will meet the heat transfer surface (101) on a lock down (FIG. 1) position and the thermal process will start. The compressible holder (102) when in locked up (FIG. 2) position have a distance from the heat transfer surface (101) that can go from 0.1 mm up to 10 mm, when in lockdown position (FIG. 1) the distance will be virtually 0 mm. This configuration comprises a spring (118) which can be an extension from the holder (102) itself or an added embodiment made of metal, polymer or other. The diameter from the spring (118) can differ from 3 mm up to 10 mm and can be disposed in several configurations and quantity. The extension of the spring (118) moving away from the bottom surface from the holder (102) can change from 0.1 mm up to 10 mm and will control the initial distance from the holder (102) to the heat transfer surface (101).

In an embodiment, the holder with tab configuration (102b) will maintain the containers (109) on a ready to start lock up (FIG. 2) position, by the mechanical resistance from the tabs (120). When the pressing means (103) forces the containers (109) with down force enough to override the tabs elastic force or break the tabs, these, will meet the heat transfer surface (101) on a lock down (FIG. 1) position and the thermal process will start. The holders (102) when in locked up (FIG. 2) position have a distance from the heat transfer surface (101) that can go from 0.1 mm up to 10 mm, when in lockdown position (FIG. 1) the distance will be virtually 0 mm. This configuration comprises a tab (120) which can be an extension from the holder (102) itself or an added embodiment made of metal, polymer or other. The width from the tab (120) can differ from 2 mm up to 10 mm and the length from 4 mm to 15 mm, the tabs (120) can be disposed in several configurations and quantity. The extension of the tab (120) moving away from the bottom surface from the holder (102) can change from 0.1 mm up to 10 mm and will control the initial distance from the holder (102) to the heat transfer surface (101).

In an embodiment, the holder with pin configuration (102c), the holder (102) and the contact layer (119) are touching the heat transfer surface (101) when in lock up (FIG. 2) position. When in locked down (FIG. 1) position, the pressing means (103) will make down force on the containers (109) overriding the mechanical resistance from the pins (121) breake or flex these during the process. The pins can be disposed in any number or configuration within the cavities from the holder (102) and can be part of it or an added embodiment from any polymer, metal or other which is glued, encrusted or added by any other process of keeping it on a standby position. The pins (121) can be disposable, if breakable, or can be of several uses if flexible. The distance from the containers (109) bottom, to the contact layer (119) or heat transfer surface (101), depending on the configuration, can be from a distance of 0.1 mm up to 10 mm.

In an embodiment, the pressing means (103) will mechanically actuate to compress the containers (109) to the heat transfer surface (101) or contact layer (119), depending on the configuration. The driver have two positions that are represented on FIG. 1 and FIG. 2, lock down and lock up respectively. When the pressing means (103) is set to the lock up position (FIG. 2) the containers (109) stand in a standby position separated from the cold heat transfer surface (101) by a air gap that can differ from 0.1 mm to 10 mm. When the driver is on lock down (FIG. 1) position the existent air gap is virtually removed. This will be possible with a contact layer (119) or any fluid, paste, sticker or other that stays between the containers (109) and the heat transfer surface (101). In FIG. 1 and FIG. 2 is represented only an example of a manual configuration for the pressing means (103) actuation. The pressing means (103) can also be operated by a mechanical actuator controlled electronically.

On the example of the FIG. 1 and FIG. 2 the compressor (108) is a heavy piece that counter the area of incidence from the containers (109), permitting to reach all containers (109) in a well distributed pressure zone. In the example, the compressor (108) is supported by a pivot (107) that allow the compressor (108) to adjust along all the containers (109) while the pressing means (103) moves to the lock down position (FIG. 1). The pivot (107) position alongside with the design from the pressing means frame (104), will force the compressor (108) to stay in horizontal position during the downforce from the mechanism. This configuration of the pressing means frame (104) plus the pivot (107), have mechanical stops allowing a regular use from the holder (102) even if not all cavities are filled with containers (109). It is also represented the hinge (106) and the handler (105) as a possible configuration for this mechanism.

Another aspect of this disclosure relates to a method of freezing biological solutions, using the previously described device, comprising the steps of:

pre-cooling the heat transfer surface (101) to a low temperature (for example lower than −40° C.);

placing of at least one container (109) in the holder (102), and contacting the bottom of all the containers (123) simultaneously within the heat transfer surface (101) by pressing the holder (102) by means of pressing means (103) on a lock down position, to enable controlled nucleation;

after nucleation of a minor layer of volume (≤20% of the total volume), setting the pressing means (103) to a lock up position and the holder (102) stand in a standby position separated from the heat transfer surface (101) by a air gap that go from 0.1 mm up to 15 mm, while maintaining the biological solution near 0° C., to avoid that the liquid fraction freezes uncontrolled after the nucleation;

setting the pressing means (103) to a lock down position, pressing the holder (102) against the heat transfer surface (101), promoting the contact of the bottom of the containers (123) with the cold heat transfer surface (101);

setting the device to a controlled freezing rate, promoting the unidirectional bottom-up freezing geometry.

An important aspect of this disclosure is to attain a good contact between the bottom of the containers (123) and the heat transfer surface (101), to promote a controlled and uniform nucleation in all the containers. Therefore, as source of cold to induce nucleation, it can be used a heat transfer surface with a flat configuration (101a) or a recess configuration (101b). The recess configuration (101b) will improve the heat transfer between the heat transfer surface (101) and the containers (109), since it can be filled with a specific height of a contact promoting material (such as a liquid or a polymer), as previously described. This recess configuration (101b) will allow that all the containers will have the same height of a contact promoting material independent of the number of containers used.

Further examples are discussed in detail below with regards to nucleation times of different aqueous solutions during the freezing process, using or not a contact promoting material.

In an embodiment, several containers filled with a liquid height of 6 mm were placed in the previously described holder (102), and pressed by means of the pressing means (103) against the heat transfer surface (101). For this experimental assay two different aqueous solutions were used, a 10% trehalose solution (FIG. 10) and a 10% DMSO solution (FIG. 11).

Figure 10:
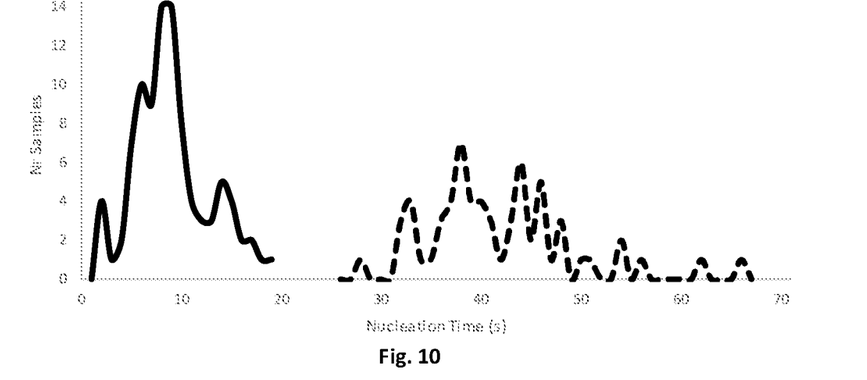
FIG. 10. Shows the effect of using (black line) or not (dashed line) a contact promoting material in the heat transfer surface (shown in FIG. 5), on nucleation times of aqueous solution containing 10% trehalose provided with a device according to the embodiments previously disclosed.
Figure 11:
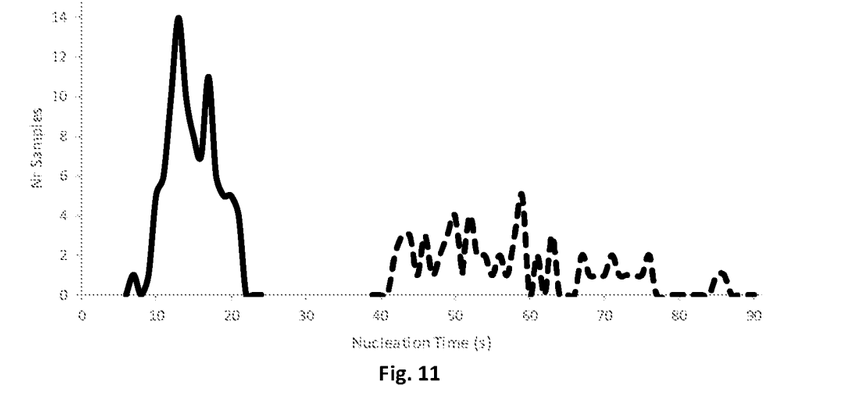
FIG. 11. Shows the effect of using (black line) or not (dashed line) a contact promoting material in the heat transfer surface (shown in FIG. 5), on nucleation times of aqueous solution containing 10% DMSO provided with a device according to the embodiments previously disclosed.

FIGS. 10 and 11 show the typical ranges of nucleation times of two aqueous solutions within the containers with a liquid height of 6 mm. As can been seen in FIG. 10, when using a contact promoting material in the nucleation process, all the samples nucleates in the range of 1 to 20 seconds, while this range increases to 26 to 67 seconds if no contact promoting material is used. When looking to the nucleation of the trehalose solution (FIG. 10), 66% of the samples nucleates in a range of 5 seconds (between 5 and 10 seconds) using a contact promoting material, while the distributions of nucleation times without a contact promoting material is wider in a range of 25 seconds (between 32 and 57 seconds). Similar results were observed in the nucleation of 10% DMSO solution (FIG. 11), where it can be seen that using a contact promoting material the nucleation occurs faster (5-20 seconds) and in a shorter range of time.

In an embodiment, the method and device of the present invention are used not only for freezing, but also for thawing a biological sample.

Therefore, when compared to the wide spectrum of nucleation times that results from the use of a heat transfer surface with flat configuration and without contact promoting material, the recess configuration with a specific height of contact promoting material provides a greater degree of nucleation control which likely impacts other performance aspects and characteristics of the freezed solution.

Another important aspect of this disclosure is to decouple the nucleation from the controlled-rate freezing. For this purpose, is necessary to ensure that in the nucleation step the fraction of liquid that freezes should not be higher than 20%, preferentially not higher than 10%, and then the remaining liquid fraction is freeze at a controlled rate. Thus, after nucleation of a small fraction of solution it is necessary to withdraw the samples from the heat transfer surface so that the solution do not continue to freeze uncontrollably. So, after the time required for nucleation, the samples are slightly spaced away from the heat transfer surface so that the pre-nucleated solution fraction remains frozen and the liquid fraction remains at approximately 0° C. Finally, with all the samples with a fraction of solution freezed and the remaining liquid at the same temperature (0° C.), these can then be frozen unidirectional bottom-up manner by applying a controlled freezing rate.

The term "comprising" whenever used in this document is intended to indicate the presence of stated features, integers, steps, components, but not to preclude the presence or addition of one or more other features, integers, steps, components or groups thereof.

It will be appreciated by those of ordinary skill in the art that unless otherwise indicated herein, the particular sequence of steps described is illustrative only and can be varied without departing from the disclosure. Thus, unless otherwise stated the steps described are so unordered meaning that, when possible, the steps can be performed in any convenient or desirable order.

The disclosure should not be seen in any way restricted to the embodiments described and a person with ordinary skill in the art will foresee many possibilities to modifications thereof.

The above described embodiments are combinable. The following claims further set out particular embodiments of the disclosure.

REFERENCES

[1] Rodrigues M A, Balzan G, Rosa M, Gomes D, de Azevedo E G, Singh S K, et al. The importance of heat flow direction for reproducible and homogeneous freezing of bulk protein solutions. Biotechnol Prog 2013; 29:1212-21. doi:10.1002/btpr.1771.

[2] Rosa M, Tiago J M, Singh S K, Geraldes V, Rodrigues M A. Improving Heat Transfer at the Bottom of Vials for Consistent Freeze Drying with Unidirectional Structured Ice. AAPS PharmSciTech 2016; 17:1049-59. doi: 10.1208/s12249-015-0437-3.

[3] John Morris G, Acton E. Controlled ice nucleation in cryopreservation—A review. Cryobiology 2013; 66:85-92. doi:10.1016/j.cryobiol.2012.11

The invention claimed is:

1. A device for bottom up geometry freezing and ice nucleation of at least one sample of a biological solution, comprising:
   a heat transfer surface at a bottom portion of the device;
   a holder comprising at least one cavity for a container of the biological solution, wherein the holder comprises a low heat conductivity material; a pressing mechanism configured to place the container in contact with the heat transfer surface, and transfer heat from the heat transfer surface to the container, and configured to remove the container away from the heat transfer surface after a fraction of 10% of the total sample volume is frozen, and re-contact the container with the heat transfer surface;
   wherein the heat transfer is carried out from the bottom of the container, enabling controlled nucleation;
   wherein the holder comprises a compressible device selected from a spring, a tab or a pin, such that the holder is compressible between a first position and a second position, wherein the first position places the bottom of the container in contact with the heat transfer surface and the second position places the bottom of the container away from the heat transfer surface, and wherein the holder is pressed against a carved configuration of the heat transfer surface, wherein the carved configuration of the heat transfer surface is a depression with a depth between 0.5-3 mm;
   a fin supporter for attaining a uniform heat exchange over the exposed area, and fins for providing an increase of a contact area with a cooling agent, a contact layer for removing residual air between the heat transfer surface and the container, wherein the contact layer is a liquid, a paste, a paper or a sticker, and wherein the contact layer has a height from 0.1 mm-3 mm.

2. The device of claim 1, wherein the pressing mechanism comprises a compressor for countering the holder, such that an even-distributed pressure is applied on the holder.

3. The device of claim 1, wherein the low heat conductivity material is plastic, ceramic or a composite.

4. The device of claim 1, wherein the pressing mechanism is configured to: place a portion of the container in contact with the heat transfer surface, transfer heat from the heat transfer surface to the portion of the container, remove the container away from the heat transfer surface and replace the portion of the container in contact with the heat transfer surface, and wherein the portion of the container is the bottom of the container.

5. The device of claim 1, wherein the heat transfer surface has a channel for removing an excess of liquid.

6. The device of claim 1, wherein the heat transfer surface is made of a conductive material selected from the group consisting of: stainless steel, copper, aluminum, and mixtures thereof.

7. The device of claim 1, further comprising a coolant reservoir for storing a cooling agent.

8. The device of claim 1, further comprising an insulation frame for insulating the heat transfer surface from the room temperature and for protecting the user.

9. The device of claim 1, wherein the bottom of the container is made of a high conductivity material selected from the group consisting of stainless steel and aluminum, or made using low conductive materials comprising polymers or glass.

* * * * *